Figure 1:
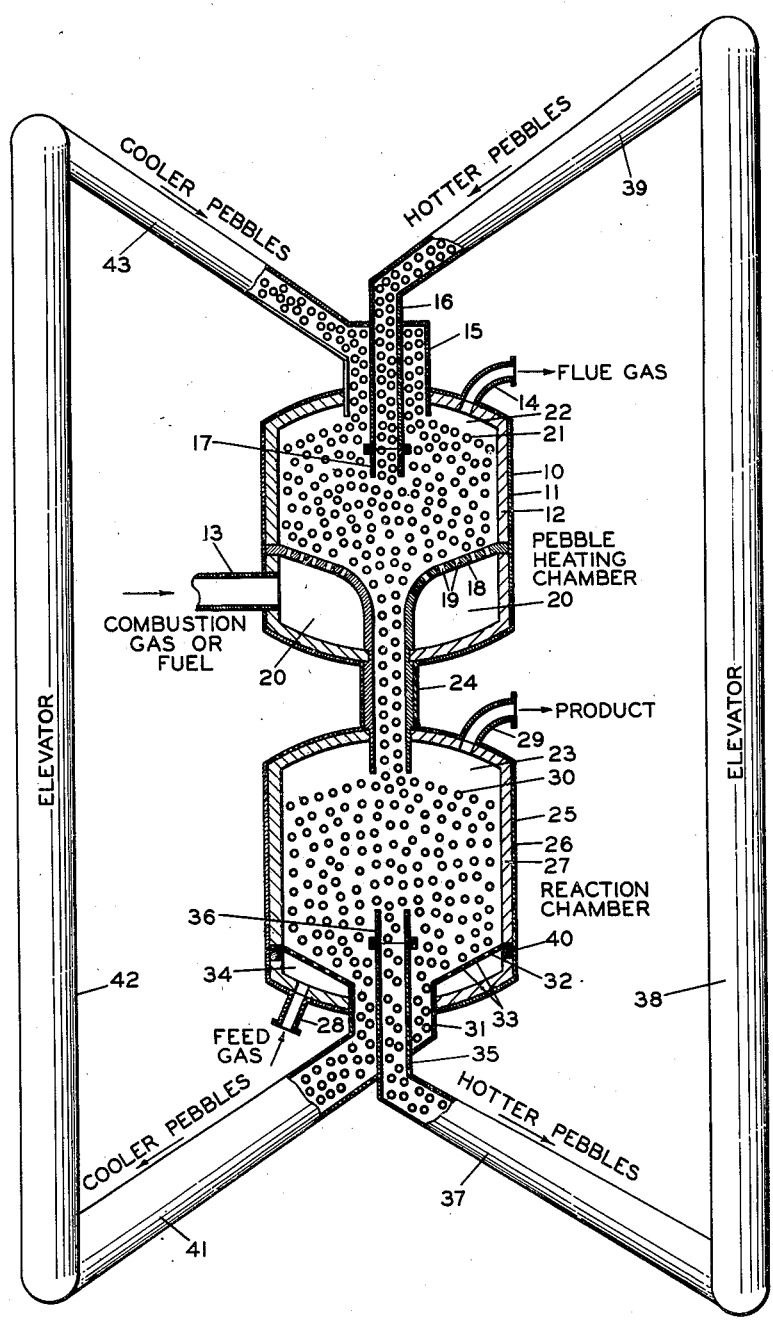

INVENTOR
L. J. WEBER
BY Hudson and Young
ATTORNEYS

Patented Nov. 14, 1950

2,530,274

UNITED STATES PATENT OFFICE 2,530,274

PEBBLE HEATER SYSTEM AND METHOD OF OPERATION

Louis J. Weber, Bartlesville, Okla., assignor to Phillips Petroleum Company, a corporation of Delaware Application December 9, 1946, Serial No. 715,076

15 Claims. (Cl. 23—284)

This invention relates to improved pebble heater apparatus and to an improved process for treating gases in a pebble heater. A specific aspect of the invention pertains to a method and apparatus for recirculating separate streams of pebbles at different temperatures from various points in the main pebble stream below the heating chamber to the pebble heating chamber of a pebble heater unit.

Typical pebble heater operation involves heating a mass of small refractory elements called pebbles in a slowly descending stream by countercurrent contact with hot gas, such as combustion gas, in an upper chamber, passing the resulting hot mass of pebbles through a lower reaction or treating chamber in contact with a gas to be treated or converted. As the pebbles leave the reaction chamber they descend into an elevator which lifts them to a height above the inlet to the pebble heating chamber from which they descend into the pebble heating chamber to be again reheated and passed through the reaction chamber. The flow of gases through the two chambers may be concurrent as well as countercurrent.

The term pebble as used throughout the specification denotes any flowable material in particulate form which withstands the extremely high temperatures involved without serious disintegration. Various refractory materials in the form of small spheres of a size of about ⅛ inch to about 1 inch in diameter, more practically, $\frac{3}{16}$ inch to ⅝ inch in diameter function advantageously. Pebbles of uniform size and shape are preferable but they may be irregular in both size and shape. Since the pebble heater has its greatest utility in heating and/or reacting gases at temperatures of from about 1300° F. to about 3000° F. pebble materials must be selected which are extremely rugged at these high temperatures. Pebbles may be relatively inert toward the gases being treated or may be highly catalytic. Such materials as alumina, beryllia, zirconia, mullite, periclase, silicon carbide, clays, and synthetic metal oxide gels make excellent contact materials for some processes. These materials may be impregnated with more highly active catalytic materials. Pebbles of metal, alloy, and active carbon may also be used.

This invention is applicable to any gas-solid contact operation which is carried on at elevated temperatures. One of the principal applications is in the conversion of hydrocarbons involving thermal and/or catalytic processes. The invention is also applicable to the heating of feed, air, steam, and other gases in which little or no reaction is involved.

It is an object of the present invention to provide a means and method of obtaining increased thermal efficiency in pebble heater operation. It is also an object of the invention to provide for more flexible operation of a pebble heater unit. A further object is to reduce thermal shock to pebbles in pebble heater operation with consequent reduction in pebble breakage. Other objects of the invention will become apparent from the accompanying disclosure.

My invention provides a method and means of withdrawing multiple streams of pebbles at different temperatures from a pebble heater chamber below the heater itself and reintroducing the individual pebble stream into the pebble heating chamber. The hotter pebble stream is withdrawn from any desired level within the pebble chamber above the level from which the cooler pebble stream is withdrawn. While it is preferred to reintroduce the various pebble streams at different temperatures into the pebble heating chamber at different levels according to the temperature of the stream being introduced in order to introduce the hot pebbles at a point of substantially the same temperature as the pebbles themselves, the various pebble streams may be introduced at about the same point and at about the same level. In pebble heater installations utilizing two chambers, multiple streams at different temperatures are withdrawn from the reaction or gas treating chamber and reintroduced into the pebble heating chamber, preferably, at temperature levels according to the temperature of the individual stream. Some pebble heater installations utilize a third chamber positioned below the reaction chamber in which the pebble stream transfers heat to the feed gas being treated in the reaction chamber. In this type of installation, the cooler pebble stream is withdrawn from the bottom of the lower chamber or gas preheating chamber, but hotter streams of pebbles may be withdrawn from a high level in the lower chamber, from the throat connecting the reaction chamber and the lower chamber, or from any desired level inside the reaction chamber.

Other pebble heater installations utilize a fourth chamber positioned above the pebble heater chamber proper and termed a pebble preheating chamber. In this fourth chamber pebbles are preheated by contact with such gases as the product gas, the flue gas from the pebble heating chamber proper, or any other waste heat gas. In an installation utilizing a pebble preheating chamber the coldest stream is introduced to the upper portion of pebble preheating chamber, but hotter streams may be introduced to the pebble heating chamber proper, or to the pebble preheating chamber at various levels. For instance, it is feasible to introduce the coolest pebble stream into the top of the pebble preheating chamber, a hotter stream to a lower level in the pebble preheating chamber and the hottest pebble stream to a desirable level in the pebble heating chamber proper. When only two streams of two different temperatures are withdrawn from the system, the hotter stream may be introduced advantageously at any desirable level in either the pebble preheating chamber or the pebble heating chamber depending upon the temperature of the hotter pebble stream and the temperatures obtained in the two chambers.

My invention improves thermal efficiency in pebble heater operation. In endothermic processes in which gases fed into the lower section of the reaction chamber are preheated a considerable amount before reaching the reaction temperature, most of the reaction, and therefore most of the heat transfer between pebbles and gas occurs in the upper portion of the reaction chamber. This means that in situations where the whole pebble stream is contacted with the feed gas in the lower half of the chamber, the outlet temperature of the pebble stream is not sufficiently low to utilize to the greatest extent the heat in the combustion gas in the pebble heating chamber. It is quite obvious that the gas passing through the pebble heating chamber cannot be reduced in temperature below the temperature of the incoming pebbles. My invention makes it possible to reduce the outlet temperature of the main pebble stream to such an extent that greater utility is made of the sensible heat in the combustion gas in the pebble heating chamber. This is made possible by removing any desirable portion of the pebble stream passing through the reaction chamber from a high temperature level therein and reintroducing the hotter pebble stream into the pebble heater chamber at a comparable temperature point thereby effecting greater reduction in the temperature of the remaining descending pebble stream and consequent lower stack gas temperature.

Figure 2:
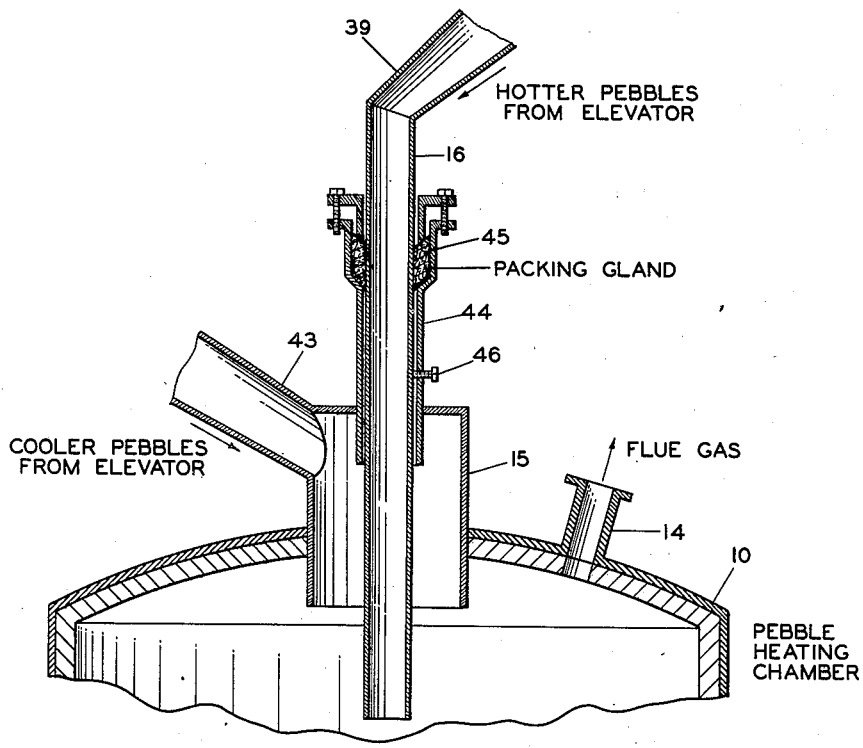
Figure 3:
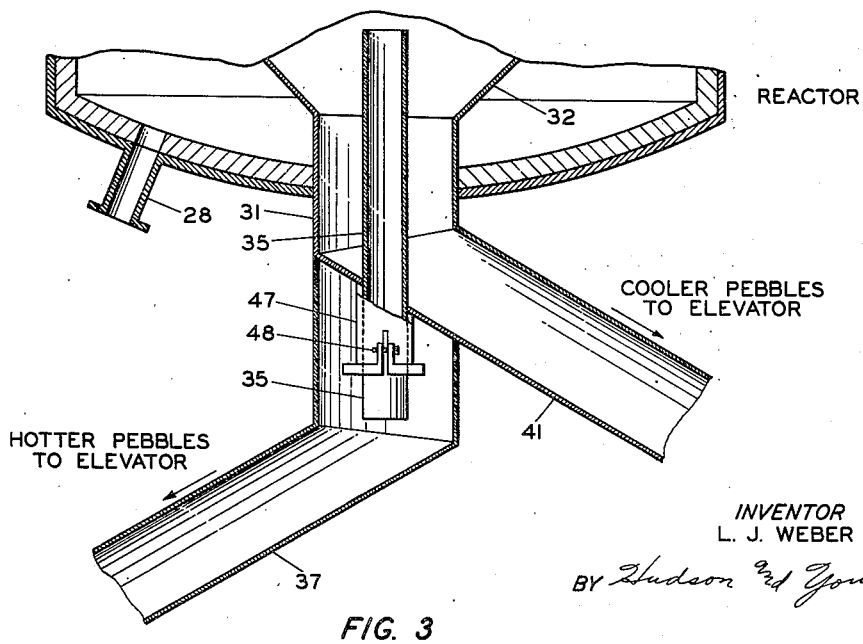

In order to facilitate understanding of the invention, reference is made to the drawing of which Figure 1 is an elevational view partly in section of one arrangement of apparatus according to the invention. Figure 2 is a fragmentary sectional view on a vertical plane illustrating one modification of the pebble inlet means to the pebble heating chamber. Figure 3 is a fragmentary sectional view on a vertical plane illustrating one modification of means for withdrawing separate streams of pebbles from a pebble heater unit.

Referring in detail to Figure 1, numeral 10 designates a pebble heating chamber having a metal shell 11 and a refractory insulating lining 12. Numeral 13 refers to an inlet for hot combustion gas or fuel to be burned in zone 20 surrounding refractory arch support 18, having holes 19 therein for passage of hot combustion gas therethrough. Numeral 14 designates the stack for removal of flue gas. Pebble inlets 15 and 16 admit cooler and hotter pebble streams respectively. A removable section 17 on the lower end of pebble inlet 16 provides for regulating the level at which pebbles are introduced into the interior of the heating chamber. End section or member 17 may be attached to pebble inlet conduit 16 in any desirable manner other than that shown, such as a threaded joint or a slip joint. Heating chamber 10 encloses a slowly descending mass of pebbles having a top surface 21 and forming a vapor collecting space 22 above the bed of pebbles.

Pebble heating chamber 10 is connected to reaction chamber 25 by a refractory-lined throat 24. Chamber 25 which is used as a reaction chamber or gas heating chamber has a metal shell 26 and a refractory lining 27. Numeral 28 refers to an inlet for admitting feed gas to annular space 34 surrounding the conical bottom 32, which is perforated by holes 33 for passage of the feed gas into the reaction chamber. Numeral 29 designates a product take-off line. The pebbles passing into the lower chamber through throat 24 form a pebble bed having a top surface 30 and providing a vapor space 23 between the bed of pebbles and the dome of the treating chamber. Pebble outlets 31 and 35 are arranged concentrically with each other for the removal of a cooler and a hotter pebble stream, respectively. Outlet conduit 35 terminates in its upper end in a removable section 36 which provides for withdrawal of pebbles from any desired level in chamber 25. Conical bottom 32 is supported in the reaction chamber by ring 40 which is welded to shell 26. Pebble outlet 31 is in closed communication with chute 41, pebble elevator 42, and chute 43 for circulation of a stream of pebbles back to pebble heating chamber 10 via pebble inlet 15. Pebble outlet 35 is in closed communication with chute 37, pebble elevator 38, and chute 39 for return of a hotter stream of pebbles to pebble heater 10 via pebble inlet 16.

Figure 2 shows a modification of the means for admitting pebbles to the pebble heating chamber of Figure 1. (Similar parts in Figures 1, 2, and 3 are numbered alike.) Pebble inlet conduit 16 extending into heating chamber 10 is in slidable relation with pebble inlet 15, through adjustable packing gland 45 positioned on the upper end of conduit 44, which is fastened securely to the end member of pebble inlet conduit 15. A set screw 46 aids in securing pebble inlet conduit 16 in any desirable elevation adjustment.

Figure 3 shows a modification of the means for withdrawing two separate streams of pebbles from reaction chamber 25 of Figure 1. Pebble outlet conduit 35 forms a slip joint with conduit 47 and may be adjusted vertically for different levels of pebble takeoff in reaction chamber 25. A screw or bolt 48 serves to tighten slip-on conduit 47 and thus secure conduit 35 at any desirable elevation.

It is imperative that pebble heater apparatus be designed so as to permit relatively free flow of pebbles through the various pebble passageways. Where pebble passageways of circular cross section are utilized it is found that the diameter thereof must be 6 or more pebble diameters. This means that conduits 35 and 16 must have a minimum diameter of 6 pebble diameters. It is also found that the annular passageways in conduits 15 and 31 must be at least 3 pebble diameters across. Since a blocking gas, such as steam, is usually admitted to the various pebble passageways to prevent escape of gases to the pebble chambers there is a practical limit on the maximum dimensions of these various pebble passageways.

Pebble heater apparatus is applicable to a variety of processes ranging in temperature from about 1300 to 3000° F. The materials used in the construction of the unit will depend upon the particular temperature ranges for which the unit is designed. In most installations the cooler pebble stream can be recycled at sufficiently low temperatures to use ordinary carbon steel equipment in the chutes and elevator. Various stainless steels are the most suitable material for constructing pebble conduits, chutes, and elevators for recycling hotter pebble streams.

The design of Figure 1 provides for flexibility of operation by varying the length of the extension attached to the pebble inlet and pebble outlet conduit for the hotter pebble stream. The modification illustrated in Figure 2 makes it possible to vary the point of inlet without shutting down operation. It may also be desirable to use this modification for a pebble outlet in the same installation. If desired, the upper end of pebble outlet 35, or extension member 36, may be funnel or hopper shaped to facilitate the removal of pebbles.

To illustrate the invention in a hydrocarbon cracking process, the mass of pebbles slowly descending through pebble heater chamber 10 is heated by contact with hot combustion gas admitted through line 13, passing upwardly through holes 19, and out through stack 14. The pebbles passing through throat 24 are at a temperature above a predetermined reaction temperature and as they pass through reaction chamber 25, they are contacted by a stream of suitable hydrocarbons admitted through line 28 and passing through hole 33 into the pebble bed. The lower half of the reaction chamber serves as a hydrocarbon preheating chamber, since most of the cracking takes place in the upper portion of the reaction chamber. It is there that the greatest amount of heat transfer between the pebbles and the gas takes place. It is preferable to remove the hotter stream of pebbles from near the fringe of the cracking zone, thus permitting the remaining mass of pebbles to preheat the feed gas and be cooled to a lower degree than they would otherwise. Effluents from the reaction zone pass out through line 29 and are led to any desirable gas separation or other treatment means not shown.

The colder mass of pebbles exit through outlet 31 into chute 41, which takes them into a bucket or other type elevator 42. Elevator 42 is operated by a variable speed motor not shown which controls the rate at which pebbles are recirculated in the cooler stream. The cooler stream of pebbles flows through chute 43 into inlet 15 and again enters the pebble heating chamber. The hotter stream of pebbles withdrawn through outlet 35 flows into chute 37 which takes it to elevator 38. This elevator which is also operated by a variable speed motor elevates the pebbles and drops them into chute 39 from which they flow into inlet conduit 16 and are delivered to the heating chamber at a point where the temperature of the main mass of pebbles is approximately that of the hotter pebble stream being introduced thereto.

In a typical utilization of my invention, a feed stock having the following composition by weight per cent:

| | |
|---|---|
| Methane | 2.6 |
| Ethane | 21.6 |
| Propane | 74.5 |
| Butanes and heavier | 1.3 | is processed in apparatus arranged according to Figure 1 to produce an olefin-rich gas of the following composition by weight per cent:

| | |
|---|---|
| Hydrogen | 2.1 |
| Methane | 21.0 |
| Ethylene | 36.5 |
| Ethane | 13.4 |
| Propylene | 9.4 |
| Propane | 7.7 |
| Butanes and heavier | 9.9 | under the following temperature conditions:

| | °F. |
|---|---|
| Feed in line 28 (Fig. 1) | 100 |
| Product in line 29 | 1750 |
| Combustion gas in line 13 | 3000 |
| Stack gas in line 14 | 500 |
| Pebbles in throat 24 | 2000 |
| Pebble stream in outlet 31 | 400 |
| Pebble stream in inlet 15 | 375 |
| Pebble stream in outlet 35 | 1500 |
| Pebble stream in outlet 16 | 1450 |

A relatively constant feed rate of 68,623 cu. ft. per hour is maintained with a production of 122,917 cu. ft. of product gas using ⅜ inch dense high purity alumina pebbles.

In a similar process in which a single stream of pebbles is removed from the bottom of the reaction chamber and reintroduced into the top of the pebble heating chamber, it is found impractical to maintain a stack gas temperature of less than about 750° F. This is due to the fact that the recirculated single pebble stream is at a much higher temperature than the cooler pebble stream made possible by my invention and the stack gas temperature can only approach the temperature of the pebbles introduced into the top of the heating chamber. The improved thermal efficiency effected by my invention is obvious. It is also apparent that, with a feed gas-pebble exit temperature differential of about 300° F. as effected by this invention, compared with a temperature differential of about 600° F. between outlet pebbles and feed gas obtained by prior art practices, much pebble disintegration due to thermal shock is avoided by my invention.

Various modifications of the invention will become apparent to those skilled in the art. The illustrative details disclosed are not to be construed as imposing unnecessary limitations upon the invention.

I claim:

1. A pebble heater for heating a descending contiguous mass of pebbles comprising a vertically elongated cylindrical closed vessel; a gas pervious refractory partition defining in cooperation with the walls and bottom closure member of said vessel a combustion chamber in the lower portion thereof; a pebble passageway communicating between an axially disposed opening in said partition and the pebble outlet hereinafter named; means for introducing a combustible mixture to said combustion chamber; a gas outlet in the upper portion of said vessel; a pebble outlet substantially axially positioned in the bottom of said vessel; means for introducing two separate streams of pebbles (one a relatively hotter and the other a relatively cooler pebble stream) into the upper portion of said vessel, said means comprising a pair of concentric conduits of sufficient diameter differential to form an annulus between the inner and outer conduits of said pair of sufficient cross section to permit relatively free flow of pebbles therethrough, said inner conduit adjustably extending into said vessel a substantial distance for delivery of said hotter pebble stream and said outer conduit extending thereinto a lesser distance for delivery of said cooler pebble stream.

2. The apparatus of claim 1 further characterized in that said inner conduit extends outwardly from said vessel a greater distance than said outer conduit and is fixed in slidable relation therewith.

3. The apparatus of claim 1 further characterized in that said inner conduit is in fixed relation with said outer conduit and terminates in its lower end in a removably attached section adapted for varying the depth of extension of said inner conduit into said vessel.

4. Pebble heater apparatus for heating a descending contiguous mass of pebbles comprising a vertically elongated cylindrical vessel having top and bottom closure members; a pebble outlet substantially axially positioned in said bottom; a gas-pervious refractory partition in the lower portion of said vessel disposed in spaced-apart relation to the bottom closure member thereof so as to form a combustion chamber therebetween; a refractory-walled pebble passageway communicating between an axially disposed opening in said partition and said pebble outlet; means for introducing a combustible mixture to said combustion chamber; a gas outlet means in the upper portion of said vessel; means for introducing a relatively cool stream of pebbles through the top of said vessel comprising a conduit opening into said vessel, said conduit being closed on the upper end and in communication with a pebble supply chute; and means for introducing a relatively hot pebble stream into said vessel through the closed upper end of said first-named conduit means, said means comprising a conduit of substantially smaller cross section than said first-named conduit means extending interiorly of said first-named conduit means into said vessel a substantial distance, being adapted to introduce said hot pebble stream into said vessel at a point substantially below the top of said vessel, and forming a pebble flow path with said first-named conduit means for said relatively cool pebble stream.

5. The apparatus of claim 4 further characterized in that said inner conduit is in fixed relation with said outer conduit and terminates in its lower end in a removably attached section adapted for varying the depth of extension of said inner conduit into said vessel.

6. Pebble heater apparatus for heating a descending contiguous mass of pebbles comprising a vertically elongated cylindrical vessel having top and bottom closure members; supply and discharge means leading to and from said vessel for flowing a hot gas therethrough; a pebble outlet substantially axially positioned in said bottom; means for introducing a relatively cool stream of pebbles through the top of said vessel comprising a conduit opening into said vessel, said conduit being closed on the upper end and in communication with a pebble supply chute; and conduit means positioned concentrically with said first-named conduit means, of lesser diameter than said first-named means, slidably adjustable in a vertical direction therewith, and extending into the interior of said vessel, said means being adapted to introduce a relatively hot stream of pebbles into the interior of said vessel to varying depths, said conduit means forming an annulus along a portion of its length with said first-named conduit means for flow of said cool pebble stream therethrough.

7. Pebble heater apparatus comprising an upper closed vessel having gas inlet and outlet means adapted for passing a hot gas through said vessel; pebble inlet conduit means for introducing two separate streams of pebbles at different temperatures to the upper portion of said vessel; pebble outlet means in the lower portion of said vessel; a lower closed vessel having gas inlet and outlet means adapted for passing gases to be treated through said lower vessel; pebble inlet means in the upper portion of said lower vessel in communication with said pebble outlet means in said upper vessel; conduit means for withdrawing two separate streams of pebbles at different levels and at different temperatures through the lower portion of said lower vessel; and means for transferring said separate pebble streams to the pebble inlet conduit means corresponding in temperature in said upper vessel.

8. Pebble heater apparatus comprising an upper closed vessel having gas supply means in the lower portion and gas discharge means in the upper portion; a first pebble inlet conduit means adjustably extending into the upper portion of said upper vessel for introducing a relatively cool pebble stream into the upper portion of said upper vessel; a second pebble inlet conduit means for introducing a hotter pebble stream into the upper portion of said upper vessel; pebble outlet means in the lower portion of said upper vessel; a lower closed vessel having gas supply means in the lower portion and gas discharge means in the upper portion; pebble inlet means in the upper portion of said lower vessel; conduit means connecting said pebble outlet means in said upper vessel with said pebble inlet means in said lower vessel for flow of pebbles therebetween; conduit means for withdrawing a relatively cool pebble stream from the lower portion of said lower vessel; pebble elevator means in communication with said last-named means and with said first pebble inlet means in said upper vessel; a second pebble outlet conduit means adjustably extending into the lower portion of said lower vessel for withdrawing a hotter pebble stream from a higher level in said lower vessel; and pebble elevator means in communication with said last-named means and with said second pebble inlet means in said upper vessel.

9. Apparatus of claim 8 further characterized in that said second pebble inlet means extends into said upper vessel a substantial distance and is fixed in slidable relation with a top member thereof to vary the depth of extension, and further in that said second pebble outlet means in said lower vessel is fixed in slidable relation with a bottom member thereof to vary the level at which pebbles are withdrawn therefrom.

10. Apparatus of claim 8 further characterized in that said second pebble inlet means is equipped with a removable lower end section adapted to vary the level in said upper vessel at which pebbles are introduced thereto, and further in that said second pebble outlet means is equipped with a removable upper-end section adapted to vary the level in said lower vessel at which pebbles are removed therefrom.

11. Pebble heater apparatus for effecting heat exchange between a gravitating mass of hot pebbles and a cooler gas stream which comprises a vertically elongated closed vessel having a pebble inlet in the upper portion and a pebble outlet axially positioned in the bottom thereof; a gas-pervious, funnel-shaped member extending across the lower portion of said vessel so as to funnel pebbles into said pebble outlet and provide an annular gas space between said member and the bottom of said vessel; means for introducing gas to said gas space; means for withdrawing gas from the upper portion of said vessel; a pebble conduit adjustably extending upwardly into the interior of said vessel through said funnel-shaped member so as to provide a means for withdrawing a stream of pebbles hotter than the pebbles flowing out through the outlet of said funnel.

12. Pebble heater apparatus for effecting heat exchange between a gravitating mass of hot pebbles and a cooler gas stream which comprises a vertically elongated closed vessel having a pebble inlet in the upper portion and a pebble outlet axially positioned in the bottom thereof; a gas-pervious, funnel-shaped member extending across the lower portion of said vessel so as to funnel pebbles into said pebble outlet and provide an annular gas space between said member and the bottom of said vessel; means for introducing gas to said gas space; means for withdrawing gas from the upper portion of said vessel; a first pebble conduit in communication with said pebble outlet; a second inner pebble conduit of smaller cross-section than said first pebble conduit extending interiorly thereto into the interior of said vessel so as to effect the withdrawal of separate streams of pebbles at different temperatures from said vessel through each conduit.

13. Apparatus of claim 12 further characterized in that said inner conduit is attached to said outer conduit in slidable relation therewith and adapted to remove pebbles from varying levels inside said vessel.

14. Apparatus of claim 12 further characterized in that said inner conduit is in fixed relation with said outer conduit and terminates in its upper end in a removably attached section adapted for varying the level at which pebbles are removed by said inner conduit.

15. Pebble heater apparatus comprising an upper closed vessel having a gas-pervious partition intermediate its top and bottom thereby dividing said vessel into a pebble heating chamber above and a combustion chamber below said partition; pebble outlet means in the lower portion of said vessel; a refractory-walled pebble passageway connecting said pebble outlet means with said pebble heating chamber through an opening in said partition; means for introducing a combustible mixture to said combustion chamber; means for withdrawing flue gas from said pebble heating chamber; a first pebble inlet conduit in communication with the upper portion of said pebble heating chamber for introducing a relatively cool pebble stream thereto; a second pebble inlet conduit in communication with the upper portion of said pebble heating chamber for introducing a hotter pebble stream thereto; a lower closed vessel having pebble inlet means in the upper portion and axially positioned pebble outlet means in the bottom thereof; a gas-pervious, funnel-shaped member extending across the lower portion of said vessel so as to funnel pebbles into said outlet means and provide an annular gas space between said member and the bottom of said vessel; means for introducing gas to said gas space; means for withdrawing gas from the upper portion of said lower vessel; means for passing pebbles from the pebble outlet in said upper vessel to the pebble inlet in said lower vessel; a first pebble outlet conduit in communication with the pebble outlet means in said lower vessel for withdrawing a relatively cool stream of pebbles therefrom; pebble elevator means in communication with said first outlet conduit and with said first inlet conduit; a second pebble outlet conduit in the lower portion of said lower vessel for withdrawing a stream of pebbles from a higher level therein than said first conduit; and pebble elevator means in communication with said second outlet conduit and with said second inlet conduit.

LOUIS J. WEBER.

REFERENCES CITED

The following references are of record in the file of this patent:

UNITED STATES PATENTS

| Number | Name | Date |
|---|---|---|
| 2,361,571 | Simpson et al. | Oct. 31, 1944 |
| 2,416,214 | Payne | Feb. 18, 1947 |
| 2,432,520 | Ferro, Jr. | Dec. 16, 1947 |